M. W. Knox,
Drag Saw,
No 24,564.   Patented June 28, 1859.

Witnesses:
W L Christy
Simeon Howes

Inventor:
Melvin W Knox

UNITED STATES PATENT OFFICE.

MELVIN W. KNOX, OF SHERIDAN, NEW YORK.

CROSSCUT-SAWING MACHINE.

Specification of Letters Patent No. 24,564, dated June 28, 1859.

*To all whom it may concern:*

Be it known that I, MELVIN W. KNOX, of Sheridan, in the county of Chautauqua and State of New York, have invented certain new and useful Improvements in Machines for Sawing Fire-Wood for Domestic Use; and I hereby declare that the following is a full, clear, and exact description of the construction and operation thereof, reference being had to the accompanying drawings, making part of this specification, in which—

Figure 1:
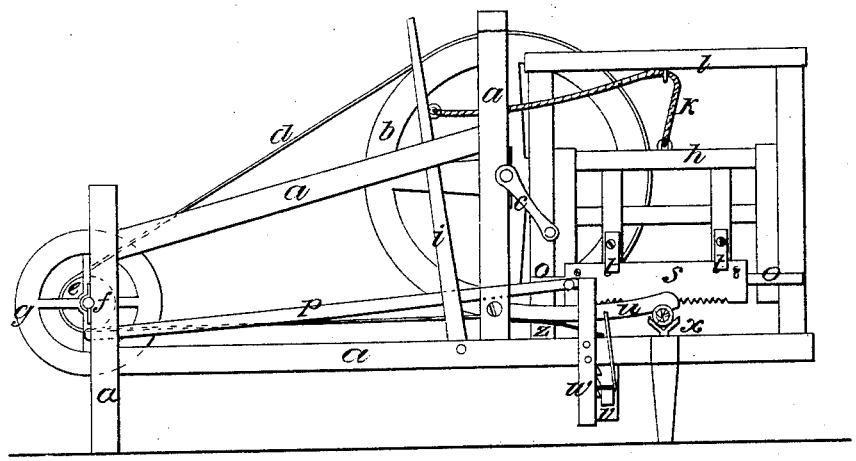
Figure 2:
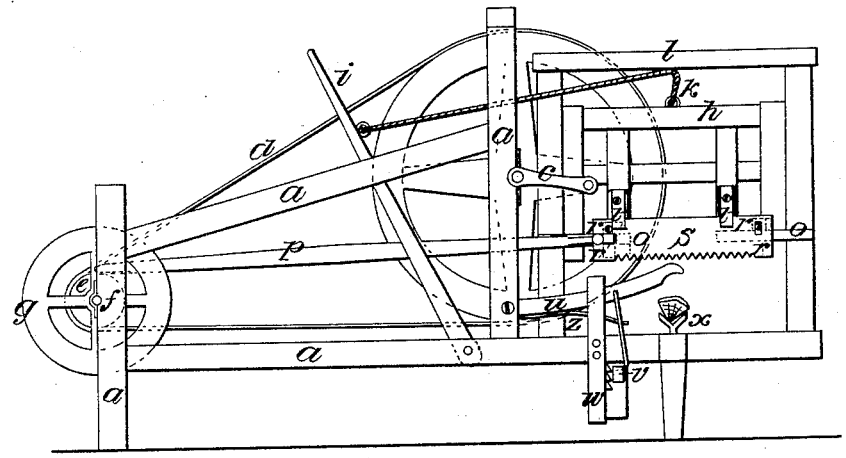

Figure 1 represents an elevation of the machine with the stick clamped, and the saw lowered ready to be operated and Fig. 2 an elevation of the same, with the clamp open and the saw elevated.

The letters of reference indicate the same parts in the different figures.

My improvements relate to a machine for sawing fire wood, by hand power, into suitable lengths for domestic use.

The following is a description of the construction and operation of the machine.

Upon a suitable frame work ($a$) a driving wheel ($b$) is mounted, its shaft being revolved by means of the crank handle ($c$), a band ($d$) from this wheel passes over a pulley ($e$) which is keyed upon the crank shaft $f$, which shaft carries a fly wheel $g$. Grooved uprights are secured to the frame $a$, and connected at the top by a cross piece. Between and guided by these uprights a saw gate or frame $h$, is placed, capable of vertical motion. It is elevated by means of the lever $i$, and cord $k$, passing through the eyebolt $l$ or a suitable pulley, it is lowered by its own gravity when the lever is released from a stud or pin on the inside of the frame which holds it back when the saw gate is required to be sustained in a raised position. The saw $s$, traverses in a horizontal position upon the dovetail guides $o$, upon which it is held by the dovetail blocks $r$, the upper one of each pair being capable of elevation or depression by means of set screws and slots in the saw. The saw can thus be removed to be changed or sharpened, and the wear of the blocks and guides compensated for. The guides $o$, do not extend the whole length of the saw a portion of the latter is left free to pass entirely through the stick. The saw is further held in position by top guides $t$.

The stick to be sawed is placed upon bearers $x$ (on of which only is shown in the drawings) and held there during the operation by a clamp $u$, which is brought down by the pressure of the foot upon a bar $v$ connected with the clamp $u$, by a rod. The upper side of the bar $v$, takes into one of the teeth of a rack $w$ on the frame. When disengaged from the rack, the clamp opens by the reaction of the spring $z$ upon the clamp. The saw receives its motion from the shaft $f$ through the pitman $p$.

This machine is intended to be operated by one man, who, standing by its side, after the stick to be sawed has been placed upon the bearers $x$, brings down the saw upon it by disengaging the lever $i$ with one hand, at the same time clamping it securely by forcing the bar $v$, down, until it engages in one of the teeth of the rack $w$, this latter movement being done by one foot. He then works the crank handle $c$, by hand, until the stick is sawed off, then with one hand releases the lever $i$, and with one foot opens the clamp. He is then ready to repeat the sawing operation as soon as the stick is moved up, or another placed upon the bearers $x$.

Having thus fully described my improvements, what I claim as my invention and desire to secure by patent is—

1. The arrangement of the several parts of a sawing machine as herein described, whereby the operator can manage the sawing, elevating and depressing the saw and opening and closing the clamp without changing his position in relation to the machine.

2. The guides $o$, and blocks $r$, when arranged in combination with the saw in the manner specified.

In testimony whereof I have signed my name to this specification before two subscribing witnesses.

MELVIN W. KNOX.

Witnesses:
W. L. CHRISTY,
SIMEON HOMES.